(12) United States Patent
Tyagi et al.

(10) Patent No.: US 9,393,879 B2
(45) Date of Patent: Jul. 19, 2016

(54) OPTIMIZING VEHICLE RECHARGING TO LIMIT USE OF ELECTRICITY GENERATED FROM NON-RENEWABLE SOURCES

(71) Applicants: Anuj Tyagi, Rochester Hills, MI (US); Vijay Vardhan, Sterling Heights, MI (US); Venkatesh Donthy, Novi, MI (US)

(72) Inventors: Anuj Tyagi, Rochester Hills, MI (US); Vijay Vardhan, Sterling Heights, MI (US); Venkatesh Donthy, Novi, MI (US)

(73) Assignee: General Motors LLC, Detroit, MI (US)

( * ) Notice: Subject to any disclaimer, the term of this patent is extended or adjusted under 35 U.S.C. 154(b) by 515 days.

(21) Appl. No.: 13/904,376

(22) Filed: May 29, 2013

(65) Prior Publication Data
US 2014/0354227 A1 Dec. 4, 2014

(51) Int. Cl.
*H02J 7/00* (2006.01)
*B60K 6/20* (2007.10)
*B60L 11/18* (2006.01)

(52) U.S. Cl.
CPC ........... *B60L 11/1844* (2013.01); *Y02E 60/721* (2013.01); *Y02T 10/7005* (2013.01); *Y02T 10/7072* (2013.01); *Y02T 10/7094* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y04S 10/126* (2013.01)

(58) Field of Classification Search
CPC ..................................................... Y02T 10/7055
USPC .......................................................... 320/104
See application file for complete search history.

(56) References Cited

U.S. PATENT DOCUMENTS

| 7,402,978 B2 * | 7/2008 | Pryor | .................. B60L 11/1816 320/104 |
| 2014/0028254 A1 * | 1/2014 | Shane | ....................... H02J 3/14 320/109 |

* cited by examiner

*Primary Examiner* — Edward Tso
*Assistant Examiner* — Ahmed Omar
(74) *Attorney, Agent, or Firm* — Leydig, Voit & Mayer, Ltd.

(57) ABSTRACT

Implementations of the present invention contemplate using the communication infrastructure represented by a network of telematics units communicatively coupled to a telematics service provider (TSP) to implement procedures designed to curtail the load placed on electricity suppliers by electric vehicles during periods of critically high demand for electricity. The present invention contemplates monitoring charging related information for multiple electric vehicles through the telematics units in those vehicles. The invention further contemplates a request from an energy utility for a response to a critically high demand for electricity and the execution of a demand response program (DRP). The DRPs involve aggregating information from a fleet of the electrically powered vehicles, processing the aggregated information, and issuing instructions to one or more vehicles in the fleet that cause the one or more vehicles to reduce the load they are placing on electricity suppliers through their charging activities.

20 Claims, 5 Drawing Sheets

OPTIMIZING VEHICLE RECHARGING TO LIMIT USE OF ELECTRICITY GENERATED FROM NON-RENEWABLE SOURCES

TECHNOLOGY FIELD

The present disclosure relates generally to vehicular telematics systems and more specifically to the use of telematics units within electrically powered vehicles to reduce the load placed on electrical utilities by electric vehicles during periods of critically high demand for electricity.

BACKGROUND

In recent years, the number of electric vehicles manufactured and sold to consumers has increased dramatically. The increase in the number of electric vehicles on the road can be attributed to both increasing awareness of the potential environmental degradation caused by widespread combustion of fossil fuels and increasing costs of the fossil fuels required to power internal combustion vehicles. However, as more consumers transition from using internal combustion vehicles to using electric vehicles, the demands placed on the utilities that supply the electricity used to charge such electric vehicles will increase.

Meanwhile, growing populations and increasing economic development have further increased the worldwide demand for electricity. Power outages have become commonplace in some parts of the world as the growth in demand for electricity has outstripped the growth in supply. As the consumption of electricity by electric vehicles continues to increase, the demand for electricity and the burden on electricity suppliers attributable to electric vehicles may grow at an even faster rate in the coming years.

SUMMARY OF THE INVENTION

Implementations of the present invention contemplate using the communication infrastructure represented by a network of telematics units communicatively coupled to a telematics service provider (TSP) to implement procedures designed to curtail the load placed on electricity suppliers by electric vehicles during periods of critically high demand for electricity. More specifically, implementations of the present invention contemplate monitoring charging related information for a fleet of electric vehicles through the communicative connections provided by the telematics units in these vehicles. Implementations of the invention further contemplate a request from an energy utility for a response to a critically high demand for electricity and the execution of a demand response program (DRP). The DRPs contemplated by the present invention involve aggregating information from a fleet of the electrically powered vehicles, processing the aggregated information, and issuing instructions to one or more vehicles in the fleet that cause the one or more vehicles to reduce the load they are placing on electricity suppliers through their charging activities.

One implementation consists of a method implemented by an information aggregator having one or more processors for reducing the electricity consumption attributable to the charging of one or more members of a fleet of electric vehicles during a period of time, the method comprising receiving, at the information aggregator, a request to activate a demand response program (DRP) for an electricity supplier, receiving, at the information aggregator, information pertaining to, on an individualized basis, members of a fleet of electrical vehicles enrolled in the DRP, identifying, based upon individualized information for members of the fleet of electrical vehicles, candidates for participation in the DRP, and transmitting instructions to the candidates to facilitate a reduction in demand for electricity attributable to charging the candidates while the DRP is active.

An additional implementation consists of a system for reducing the electricity consumption attributable to the charging of one or more members of a fleet of electric vehicles during a period of time, comprising a non-transient computer readable medium having thereon computer executable instructions, the instructions comprising instructions for receiving a request to activate a demand response program (DRP) for an electricity supplier, instructions for receiving information pertaining to, on an individualized basis, one or more members of a fleet of electric vehicles enrolled in the DRP, instructions for identifying, based upon individualized information for members of the fleet of electric vehicles, candidates for participation in the DRP, and instructions for transmitting, to the candidates, additional instructions to facilitate a reduction in demand for electricity attributable to charging the candidates while the DRP is active.

A further implementation consists of a system for reducing the electricity consumption attributable to the charging of one or more members of a fleet of electric vehicles during a period of time, the system comprising a database configured to store data pertaining, on an individualized basis, to members of a fleet of electric vehicles and the charging activities of the members, and one or more processors configured to request, on an individualized basis, information pertaining to members of a fleet of electric vehicles and the charging activities of the members, to determine whether any of the members of the fleet are enrolled in a demand response program (DRP), and to determine whether any of the members of the fleet are candidates for a cessation of charging event or a reduction in charging rate event, and to transmit instructions, on an individualized basis, to facilitate a cessation of charging event or a reduction in charging rate event to the candidates.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
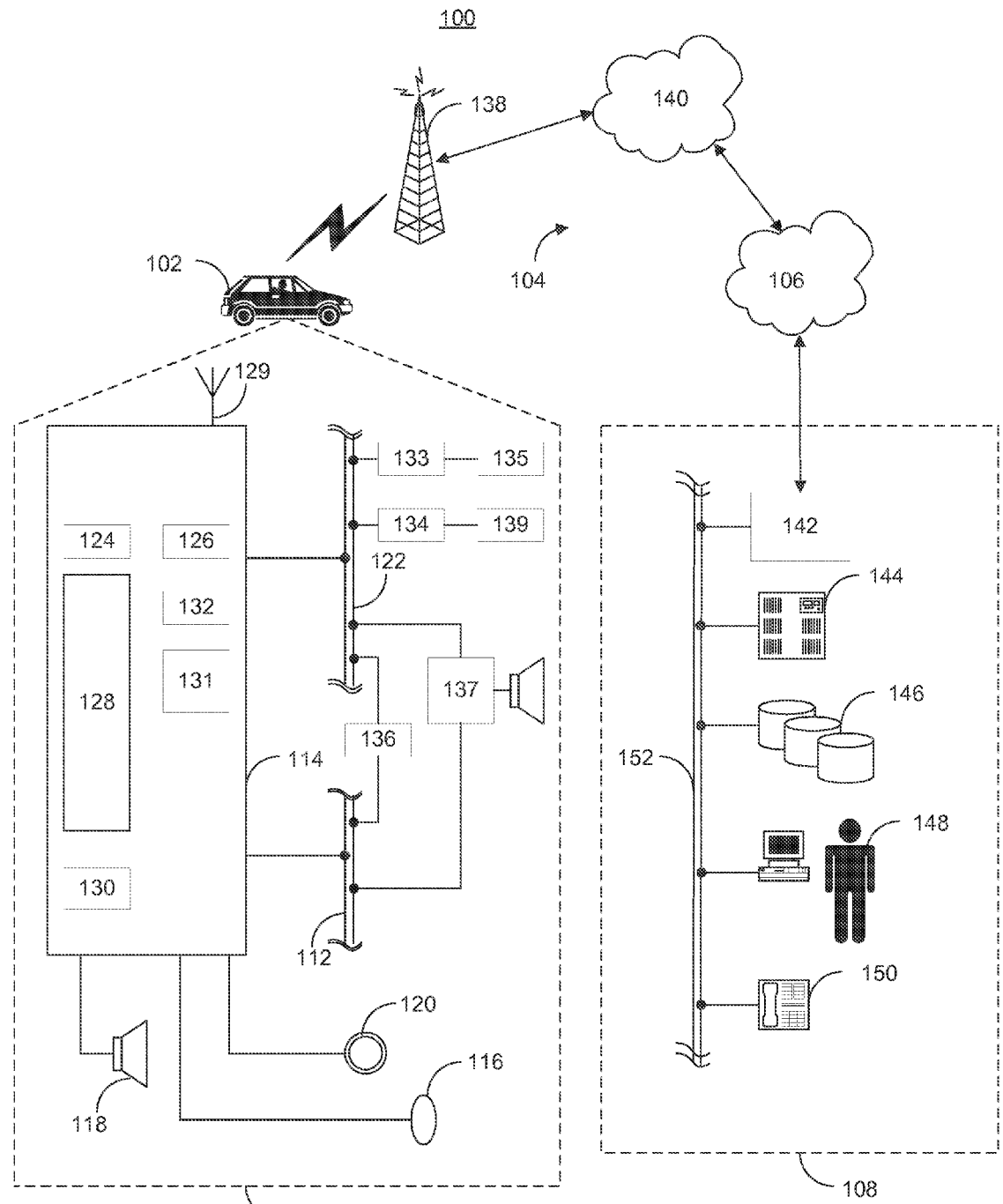
FIG. 1 is a schematic diagram of an operating environment for a mobile vehicle communication system usable in implementations of the described principles.

Before discussing the details of the invention, a brief overview of an example telematics system is given to guide the reader. FIG. 1 schematically depicts an example environment for carrying out the invention. It will be appreciated that the described environment is an example, and does not imply any limitation regarding the use of other environments to practice the invention. With reference to FIG. 1 there is shown an example of a communication system 100 that may be used with the present systems and methods and generally includes a vehicle 102, a wireless carrier system 104, a land network 106 and a call center 108. It should be appreciated that the overall architecture, setup and operation, as well as the individual components of a system such as that shown in FIG. 1 are generally known in the art. Thus, the following paragraphs provide a brief overview of one such example information system 100. However, present systems and methods could be carried out in other environments as well.

Vehicle 102 is a mobile vehicle such as a motorcycle, car, truck, recreational vehicle (RV), boat, plane, etc., and is equipped with suitable hardware and software that enables it to communicate over system 100. The vehicle 102 is, in particular, driven by an electric motor that periodically requires recharging. Additionally, vehicle hardware 110 shown generally in FIG. 1 includes: a telematics unit 114, a microphone 116, a speaker 118, and buttons and/or controls 120 connected to the telematics unit 114. A network connection or vehicle bus 122 is operatively coupled to the telematics unit 114. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name but a few.

The telematics unit 114 is an onboard device providing a variety of services through its communication with the call center 108, and generally includes an electronic processing device 128, one or more types of electronic memory 130, a cellular chipset/component 124, a wireless modem 126, a dual antenna 129 and a navigation unit containing a GPS chipset/component 132. The GPS chipset/component is capable of determining the location of the vehicle with a high degree of accuracy. For example, the GPS chipset/component could determine that an electric vehicle is located at a particular electric vehicle charging station. In one example, the wireless modem 126 comprises, and is carried out in the form of, a computer program and/or set of software routines executing within the electronic processing device 128. The cellular chipset/component 124 and the wireless modem 126 may be called the network access device (NAD) of the telematics unit 114. The NAD 114 further includes a short-range wireless unit 131 capable of communicating with a user's mobile device such as a cellular phone, tablet computer, PDA, or the like, over a short-range wireless protocol. For example, in one implementation, the short-range wireless unit 131 is a Bluetooth unit with an RF transceiver that communicates with a user's mobile device using Bluetooth protocol. Communication between the short-range wireless unit 131 and a user's mobile device may allow information pertaining to events a user intends to The telematics unit 114 provides a variety of services for subscribers. Examples of such services include: turn-by-turn directions and other navigation-related services provided in conjunction with the GPS based chipset/component 132; airbag deployment notification and other emergency or roadside assistance-related services provided in connection with various crash and or collision sensor interface modules 133 and sensors 135 located throughout the vehicle.

GPS navigation services are implemented based on the geographic position information of the vehicle provided by the GPS based chipset/component 132. A user of the telematics unit enters a destination using inputs corresponding to the GPS component, and a route to a destination is calculated based on the destination address and a current position of the vehicle determined at approximately the time of route calculation. Turn-by-turn (TBT) directions may further be provided on a display screen corresponding to the GPS component and/or through vocal directions provided through a vehicle audio component 137. It will be appreciated that the calculation-related processing may occur at the telematics unit or may occur at a call center 108.

Infotainment-related services are provided by the TSP wherein music, Web pages, movies, television programs, video games and/or other content is downloaded to an infotainment center 136 operatively connected to the telematics unit 114 via a vehicle bus 122 and an audio bus 112. In one example, downloaded content is stored for current or later playback.

The preceding list of functions is by no means an exhaustive list of all of the capabilities of telematics unit 114, as should be appreciated by those skilled in the art, but is simply an illustration of some of the services that the telematics unit 114 offers. The telematics unit 114 may include a number of components known by those skilled in the art in addition to those described above.

Vehicle communications use radio transmissions to establish a communications channel within the wireless carrier system 104 so that voice and/or data transmissions occur over the communications channel. Vehicle communications are enabled via the cellular chipset/component 124 for voice communications and a wireless modem 126 for data transmission. For example, data pertaining to a forecast of a utility's renewable energy mixture can be transmitted to the telematics unit 114 via the wireless modem 126.

To enable successful data transmission over the communications channel, wireless modem 126 applies some form of encoding or modulation to convert the digital data so that it can communicate through a vocoder or speech codec incorporated in the cellular chipset/component 124. Any suitable encoding or modulation technique that provides an acceptable data rate and bit error can be used with the present method. The dual mode antenna 129 services the GPS chipset/component and the cellular chipset/component.

The microphone 116 provides the driver or other vehicle occupant with a means for inputting verbal or other auditory commands, and can be equipped with an embedded voice processing unit utilizing a human/machine interface (HMI) technology known in the art. Conversely, the speaker 118 provides verbal output to the vehicle occupants and can be either a stand-alone speaker specifically dedicated for use with the telematics unit 114 or can be part of the vehicle audio component 137. In either event, the microphone 116 and the speaker 118 enable vehicle hardware 110 and the call center 108 to communicate with the occupants through audible speech.

The vehicle hardware also includes the one or more buttons or controls 120 configured to enable a vehicle occupant to activate or engage one or more of the vehicle hardware components 110. For example, one of the buttons 120 is an electronic push button that, when pressed, initiates voice communication with the call center 108 (whether it be a live advisor 148 or an automated call response system). In another example, one of the buttons 120, when pushed, initiates emergency services.

The audio component 137 is operatively connected to the vehicle bus 122 and the audio bus 112. The audio component 137 receives analog information, rendering it as sound, via the audio bus 112. Digital information is received via the vehicle bus 122. The audio component 137 provides AM and FM radio, CD, DVD, and multimedia functionality independent of the infotainment center 136. The audio component 137 contains a speaker system, or alternatively utilizes the speaker 118 via arbitration on the vehicle bus 122 and/or the audio bus 112.

The vehicle crash and/or collision detection sensor interface 133 is operatively connected to the vehicle bus 122. The crash sensors 135 provide information to the telematics unit 114 via the crash and/or collision detection sensor interface 133 regarding the severity of a vehicle collision, such as the angle of impact and the amount of force sustained.

Vehicle sensors 139, connected to various sensor interface modules 134 are operatively connected to the vehicle bus 122. Vehicle sensors 139 include sensors with capabilities that include but that are not limited to determining a battery's state of charge (e.g. as a percentage of the total charge capacity), the charging status of a battery (i.e. whether the battery is currently being charged), and the current rate at which the battery is being charged (e.g. as a rate of change of the percentage of capacity charged per unit time). Vehicle sensors can also include but are not limited to gyroscopes, accelerometers, magnetometers, emission detection and/or control sensors, and the like. The sensor interface modules 134 can include power train control, climate control, and body control, to name but a few.

The wireless carrier system 104 can be a cellular telephone system or any other suitable wireless system that transmits signals between the vehicle hardware 110 and the land network 106. According to an example, the wireless carrier system 104 includes one or more cell towers 138, base stations and/or mobile switching centers (MSCs) 140, as well as any other networking components required to connect the wireless system 104 with the land network 106. The mobile switching center may include a remote data server.

As appreciated by those skilled in the art, various cell tower/base station/MSC arrangements are possible and could be used with the wireless system 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to call center 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA), or any combination thereof.

The call Center (OCC) 108 is designed to provide the vehicle hardware 110 with a number of different system back-end functions and, according to the example shown here, generally includes one or more switches 142, servers 144, databases 146, live advisors 148, and a variety of other telecommunication and computer equipment 150 that is known to those skilled in the art. These various call center components are coupled to one another, for example, via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of telecommunication and computer equipment 150 for demodulation and further signal processing.

The telecommunication and computer equipment 150 includes a modem that preferably includes an encoder, as previously explained, and can be connected to various devices such as application servers 144 and databases 146. For example, the databases 146 could be designed to store subscriber profile records, subscriber behavioral patterns, or any other pertinent subscriber information. Although the illustrated example has been described as it would be used in conjunction with a manned call center, it will be appreciated that the call center 108 can be any central or remote facility, manned or unmanned, mobile or fixed, to or from which it is desirable to exchange voice and data.

A portion of the databases 146 stores information related to the vehicles enrolled in a demand response program (DRP). Information stored in this portion of the database may include a variety of identifiers for each of the vehicles that is enrolled in a DRP. For example, the databases 146 may store, for each vehicle enrolled in a program, an integrated circuit card identifier (ICCID) corresponding to the subscriber identity modules (SIMs) of the vehicle's telematics unit, an international mobile equipment identity (IMEI) corresponding to network access devices (NADs) integrated into the vehicle's telematics units, a mobile identification number (MIN), an electronic serial numbers (ESN), a mobile equipment identifier (MEID), an international mobile subscriber identity (IMSI) associated with the SIM cards of the vehicle's telematics unit, a mobile device number (MDN), a mobile station international subscriber directory number (MSISDN), a service set identifier (SSID), a media access control (MAC) address, and an internet protocol (IP) address associated with the vehicle's telematics unit. Additional information pertaining to each of the vehicles enrolled in a DRP may also be stored in the databases 146. For example, the number of demand response requests that have been made to each vehicle during a certain period of time, e.g. one year, may be stored at the databases. The average number of demand response requests that have been made to each vehicle over a certain period of time, e.g. one month, may also be stored. Furthermore, a threshold state of charge, i.e. an amount of battery charge defined by the DRP as indicative of charge level sufficient for adequate operation of the vehicle, may be stored for each vehicle. The preceding examples of information that can be stored at databases 146 is not exhaustive, and additional fields of data pertaining to each vehicle enrolled in the program as well as to other vehicles and to the program generally may also be stored at databases 146.

The servers 144 interface with electricity suppliers (not shown), databases 146, and telematics units such as the telematics unit 114. The servers 144 have processors that can be configured to request and receive information from each of one or more vehicles that are enrolled in the DRP. In some implementations, the servers 144 request, receive, and store information from vehicles in the databases 146. For example, the servers 144 may request and receive information pertaining to the state of charge of a battery in a vehicle, the charge capacity of a vehicle in a battery, the current charging status of a vehicle, the charge rate of a battery in a vehicle, the estimated time at which an ongoing or future charging event will be completed, the current location of the vehicle, and information related to an owner or user of the vehicle. This list of information that may be requested and received by the servers 144 from the vehicles is not exhaustive, and additional categories of data may be requested and received by the servers 144 and stored at the databases 146.

In general terms, not intended to limit the claims, the example environment may be used by systems and methods that utilize telematics units in order to curtail the load placed on electricity suppliers by the charging of electric vehicles during periods of critically high demand for electricity. Specifically, systems and methods described herein contemplate monitoring charging related information for a fleet of electric vehicles where such charging information is communicated by one or more vehicles in the fleet to a service provider through the telematics units in those vehicles. Systems and methods described herein additionally contemplate requests from one or more electricity suppliers for a response to a critically high demand experienced by the one or more electricity suppliers, i.e. a DRP. The DRPs contemplated by the invention involve aggregating information obtained from the fleet of electric vehicles, processing the information that has been aggregated, and issuing instructions to one or more vehicles in the fleet that cause the one or more vehicles to reduce the load they place on an electricity supplier through their charging activities.

Growing populations coupled with an increasing demand for energy resources increase the likelihood that electricity suppliers will experience a critical peak demand event, i.e. a period where the demand for electricity meets or exceeds a threshold percentage of the supply capacity of the electricity suppliers. During such periods, it is desirable to curtail demand for electrical power from electric vehicle owners that will not immediately make use of the electricity they seek to acquire for charging their vehicle batteries. For example, it would be preferable to curtail the load placed on the electricity supplier by an electric vehicle that will not be driven until well after the critical peak demand event has ended than from an air conditioning unit that is cooling a facility where a large number of laborers will work during the critical peak demand period. Implementations of the systems and methods described herein curtail power demand placed on an electricity supplier during a critical peak demand event by reducing power demand, from one or more electric vehicles that will not immediately require the stored battery power they are seeking to build, during the critical peak demand event.

Implementations of the present invention contemplate the use of telematics units and the communicative infrastructure they provide to construct and maintain a database of information pertaining to the charging of one or more electric vehicles. The information used to construct and maintain the database can be aggregated from multiple electric vehicles by one or more information aggregators, such as one or more telematics service providers (TSP). In some implementations, the database may be constructed and maintained by an information aggregator that acquires information from one or more TSPs. Information can be transmitted to the information aggregator through a process that involves one or more telematics service providers sending a request for information to one or more telematics units and that further involves a subsequent response sent by one or more of the telematics units to the information aggregator. The subsequent response from the telematics units could also be sent to the telematics service provider before being sent to the information aggregator. In some implementations, the telematics service provider and the information aggregator are the same entity.

Alternatively, the information can be aggregated through a process that involves configuring one or more telematics units to push information to the information aggregator. For example, the telematics units could be configured to push the information to the information aggregator after the expiration of a predetermined time interval, upon the occurrence of any one of a set of predetermined events, or upon the occurrence of some other triggering event.

Information contained in the database 146 may include a number of different fields, and the database 146 may be organized or indexed according to a variety of types of information. For example, the information transmitted to the database 146 by the individual telematics units may include an identifier of the telematics unit that is transmitting information to be stored in the database 146. Such identifiers may include but are not limited to any one or more of the following that is associated with the telematics unit: integrated circuit card identifiers (ICCIDs) corresponding to the subscriber identity modules (SIMs) of subscribers' telematics units, international mobile equipment identities (IMEIs) corresponding to network access devices (NADs) integrated into subscribers' telematics units, mobile identification numbers (MINs), electronic serial numbers (ESNs), mobile equipment identifiers (MEIDs), international mobile subscriber identities (IMSIs) associated with the SIM cards of subscribers' telematics units, mobile device numbers (MDNs), mobile station international subscriber directory numbers (MSISDNs), service set identifiers (SSIDs), media access control (MAC) addresses, and internet protocol (IP) addresses associated with a telematics unit. Information transmitted to the database 146 by the telematics units may also include but is not limited to a present geographic location of the vehicle, a present charge level of the vehicle's battery, a present charging status of the vehicle, a present rate of charging of the vehicle, an anticipated schedule for charging the vehicle, an anticipated schedule for using the vehicle, and an anticipated schedule of events for a user or owner of the vehicle.

The database 146 may be updated periodically by acquiring current information from the one or more vehicles upon expiration of a predetermined time interval. For example, after some point at which the database 146 has been populated with information pertaining to charging one or more electric vehicles, the database 146 may be updated such that the information contained in the database 146 does not become outdated, or stale. The information aggregator responsible for collecting data from the individual telematics units and constructing and maintaining the database 146 may send a request for updated information to individual telematics units upon passage of a predetermined period of time since the last request was sent. Alternatively, the information aggregator may broadcast a request for updated information to each of the telematics contained in enrolled vehicles units after the occurrence of some event. For example, the aggregating entity may broadcast a request for updated information to multiple telematics units after receiving a request from an electricity supplier to initiate a DRP. In alternative embodiments, the telematics units of the individual vehicles may be configured to push information to the information aggregator after a predetermined period of time has passed since they last pushed information to the information aggregator. Similarly, the telematics units may be configured to push information to the information aggregator upon determining that some information that was previously pushed to the information aggregator has become outdated or stale. For example, a telematics unit may determine that it has moved from one predefined geographic region to a different predefined geographic region and push one or more fields of information pertaining to the charging of the vehicle to the information aggregator upon detection of such transition.

Implementations of the present invention further contemplate receiving a request from an electricity supplier for initiating, or activating, a DRP. Upon receipt of such a request from an electricity supplier, an information aggregator may query the database 146 containing information pertaining to one or more vehicles and determine which of the one or more vehicles are enrolled in the DRP. In some implementations, vehicles enrolled in the DRP may agree to have a charging event ceased or slowed as a result of an electricity supplier experiencing a peak critical demand event. After determining which vehicles are enrolled in the DRP, the information aggregator may determine which of the vehicles are presently on the electrical grid, i.e. currently placing a load on the electricity supplier that requested initiation of the DRP. The information aggregator may also determine which of the vehicles will become "on grid" within the time period during which the DRP is to take place. In some instances, such information is readily available to the information aggregator, while in other implementations the information aggregator must request such information from another entity. For example, in some implementations, the information aggregator may request information pertaining to one or more vehicles from one or more TSPs. In such implementations, the TSPs may first request information from the individual telematics units of one or more vehicles. After determining which ones of the electric vehicles are presently on grid and which ones of the electrical vehicles will come on grid during a period of operation of the DRP, the information aggregator determines which of those vehicles are candidates for participation in the DRP facilitating a reduction in power demand.

Figure 2:
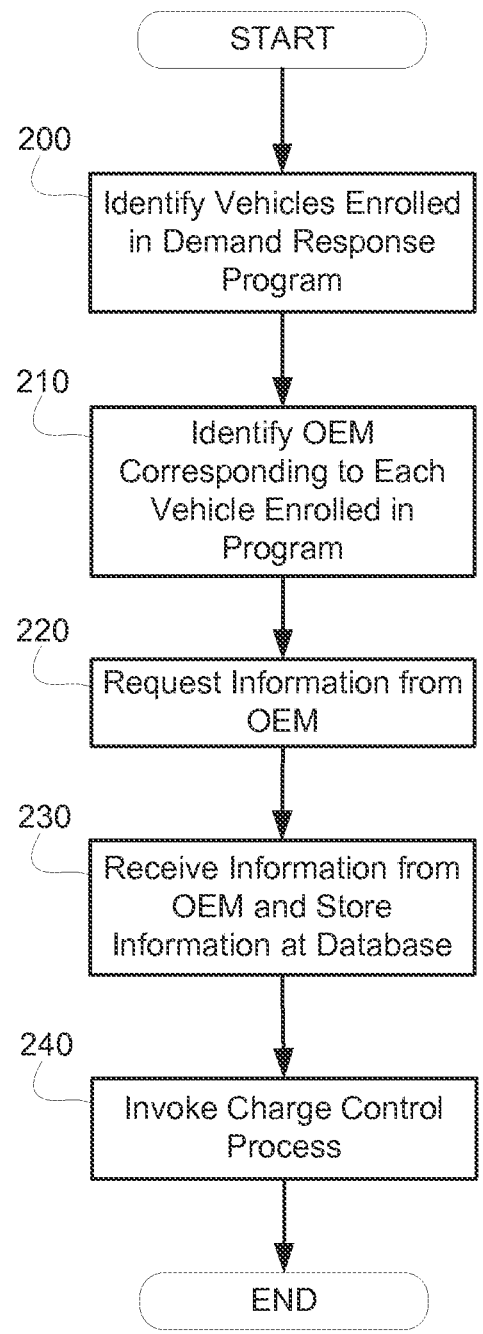
FIG. 2 is a flow chart summarizing an example process for acquiring information pertaining to one or more vehicles in a fleet of vehicles that are enrolled in a demand response program.

FIG. 2 is a flow chart summarizing an example process for acquiring information pertaining to one or more vehicles in a fleet of vehicles enrolled in a demand response program (DRP). At step 200, the vehicles enrolled in the DRP are identified. The vehicles enrolled in the DRP may be identified by entities that include, but are not limited to, electricity suppliers and information aggregators, such as TSPs. Such entities may identify the vehicles enrolled in the program through the use of a server, such as one of servers 144. Information stored on a database, such as one of the databases 146, may include a list of vehicles for which information is stored. One of the fields of information stored may be a list of DRPs in which the vehicle is enrolled. For example, the databases 146 may have information pertaining to a variety of At step 210, an identity of the original equipment manufacturer (OEM) corresponding to each of the vehicles identified at step 200 is determined. The identity of the OEM for each vehicle enrolled in the program may be stored at a database, such as one of the databases 146. Alternatively, the entity that identified the vehicles enrolled in the program at step 200 may query a telematics unit in each of the vehicles in order to ascertain the identity of the OEM for each of the vehicles. For example, the identifying entity may broadcast a data call to each of the vehicles identified in 200 and requesting that the vehicles respond by providing the identity of their OEM.

At step 220, one or more OEMs provide information pertaining to the electrical vehicles identified at step 200. The identifying entity may establish a connection with an OEM and request that the OEM provide information pertaining to vehicles identified at step 200 and that correspond to the OEM. For each vehicle, the information requested may include, but is not limited to, a vehicle identification number (VIN), an energy capacity of the battery, a current level of energy stored in the battery (charge level), a current charge status (i.e. charging or not charging), a current rate of charging, an estimated time at which charging will be completed, an estimated time at which a future charging event will commence, an estimated completion time at which a future charging event will be completed, a vehicle model, an electrical vehicle type (e.g. hybrid, pure electric vehicle), an identity of an owner or user of the vehicle, an identifier for a user account associated with the vehicle, one or more upcoming use events for the vehicle, a use schedule for the vehicle, one or more upcoming activities or events that an owner or user of the vehicle will participate in, a schedule for an owner or user of the vehicle, a use history of the vehicle, and a predictive forecast of use of the vehicle. Alternatively, the OEM may provide information only for vehicles that also are currently drawing electricity provided by the utility that is experiencing a peak critical demand. In other implementations, the OEM may provide information only for vehicles that are either currently drawing electricity provided by the utility experiencing critical demand or that are scheduled or anticipated to begin drawing electricity within a particular timeframe, e.g. the time period over which the DRP is to be implemented. At step 230, the information provided by the OEMs is stored by the information aggregator. At step 240, the charge control process is invoked. In some implementations, the process depicted by FIG. 2 may execute repeatedly during the time period during which the DRP is active. In this manner, information pertaining to the vehicles that are enrolled in the DRP may be acquired repeatedly throughout the DRP such that the information used during implementation of the DRP is kept current.

Figure 3:
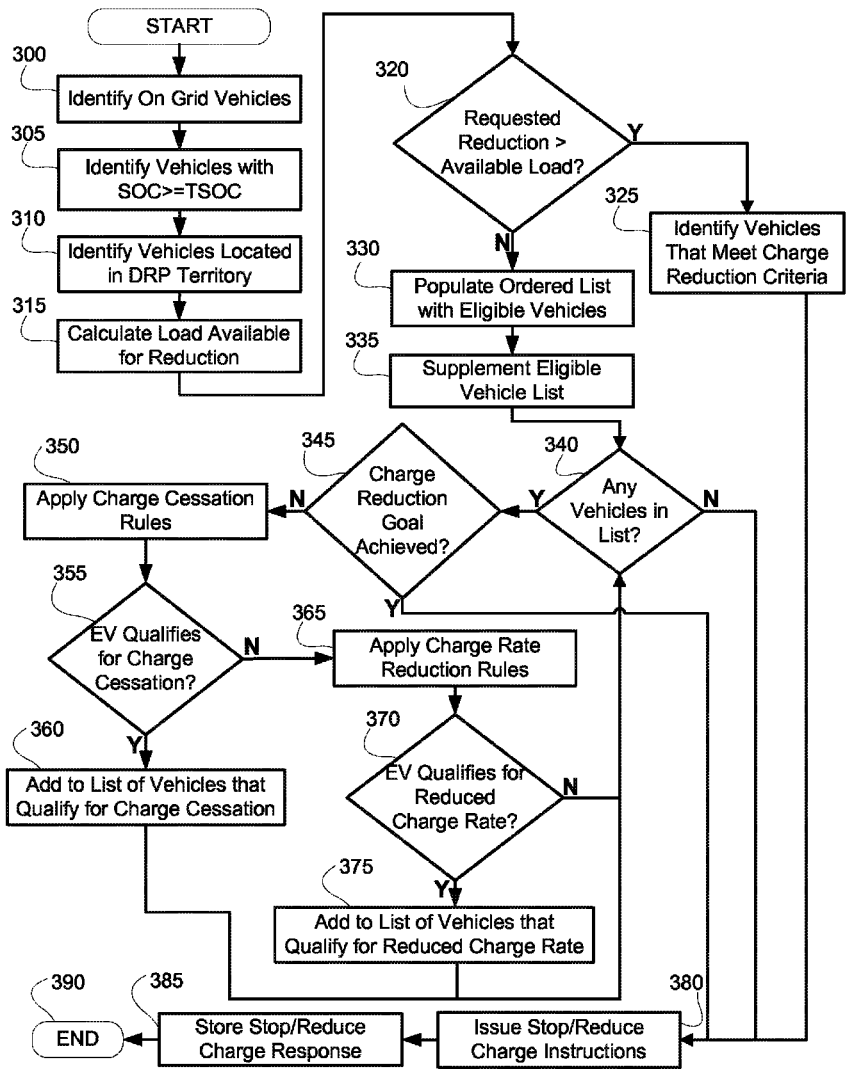
FIG. 3 is a flow chart summarizing an example process for identifying vehicles eligible for a charging cessation or a rate of charging reduction and for implementing the charging cessations and/or rate of charging reductions in the identified vehicles.

FIG. 3 is a flow chart summarizing an example process for identifying vehicles eligible for a charging cessation or a rate of charging reduction and for implementing the charging cessations and/or rate of charging reductions in the identified vehicles. At step 300, electrical vehicles that are currently "On Grid," i.e. drawing power from the electricity supplier that has requested activation of the DRP, are identified based upon information stored in a data store, such as the databases 146. Vehicles that are scheduled to begin drawing power during the DRP, i.e. come "On Grid" during the program, may also be identified based upon information stored in the data store. Information stored in the data store may include but is not limited to vehicle identification numbers (VIN), energy capacities of the batteries, current levels of energy stored in the batteries, current charge statuses (i.e. charging or not charging), current rates of charging, estimated times at which charging will be completed, estimated times at which future charging events will commence, estimated completion times at which a future charging events will be completed, vehicle models, electrical vehicle types (e.g. hybrid, pure electric vehicle), identities of owners or users of the vehicles, identifiers for user accounts associated with the vehicles, schedules for one or more upcoming use events for the vehicles, use schedules for the vehicle, schedules for one or more upcoming activities or events that owners or users of the vehicles will participate in, use histories of the vehicles, and predictive forecasts of use of the vehicles.

At step 305, vehicles are identified that have a state of charge (SOC) that exceeds a threshold SOC (TSOC) at which vehicles are defined as potential participants in an activated DRP. The TSOC is defined by, for example, the DRP. In various implementations, the TSOC may be defined by an amount of energy currently stored in the battery of a vehicle, a percent of the capacity of the vehicle charge, and a predicted range that the vehicle could travel using the amount of energy currently stored in the vehicle battery. Only enrolled vehicles meeting the TSOC are considered for participation in an active DRP. At step 310, vehicles are identified that are located in a geographic territory defined by the DRP. In some implementations, the geographic territory may be coextensive with the geographic area to which an electricity supplier provides power. In other implementations the geographic territory may be a subregion of the geographic area to which an electricity supplier provides power. In other implementations, a geographic territory defined by the DRP may include geographic areas to which more than one electricity suppliers supply electricity.

At step 315, the total load available for reduction is determined. The total load available for reduction is calculated by determining the individual load reduction represented by each of the vehicles identified at steps 300, 305, and 310 and summing the individual load reduction across all of the identified vehicles.

At step 320, the requested reduction in load is compared with the total load available for reduction. The requested reduction in load is received from the electrical utility requesting implementation of the DRP. If the load available for reduction exceeds the requested reduction in load, the process proceeds to step 330.

At step 330, the vehicles identified at step 310 are used to populate a list of electrical vehicles that qualify for cessation of charging or a reduction in the rate of charging. At step 335, the list populated at step 330 is supplemented with additional vehicles that are eligible for a cessation of charging or reduction in charging rate.

At step 340, a vehicle-by-vehicle analysis for determining which of the vehicles in the eligible vehicle list will be subjected to a cessation in charging event or a reduction in charging rate event (see step 380). The vehicle-by-vehicle analysis may be performed with the vehicles ordered based on a variety of different data fields. For example, vehicles that have previously been subjected to participation in DRPs may be considered last. Alternatively, vehicles may be ordered such that vehicles that have contributed the most load reduction to prior DRPs are considered last.

At step 340, it is determined whether or not any vehicles are in the eligible vehicle list. If no vehicles are present in the list, the process proceeds to step 380 (described below). If there are vehicles present in the list, the process proceeds to step 345. At step 345, the charge reduction achieved during prior iterations of the loop is compared to a charge reduction goal (based on the charge reduction request). If the charge reduction achieved during prior iterations equals or exceeds the charge reduction goal, the process proceeds to step 380 (described below). However, if the charge reduction achieved during prior iterations of the loop is less than the charge reduction goal, the process proceeds to step 350. At step 350, the next electrical vehicle in the eligible vehicle list is identified, and the charge cessation rule is applied to the electric vehicle. At step 355, the results of the charge cessation rule being applied to the electric vehicle are analyzed. If the electric vehicle qualifies for a charge cessation, the process proceeds to step 360. At step 360, the electric vehicle identified at step 350 is added to a list of electric vehicles that qualify for a charge cessation. After step 360 is completed, the process returns to step 340. However, if at step 355 it is determined that the electric vehicle does not qualify for charge cessation, the process proceeds to step 365. At step 365, the charge rate reduction rules are applied to the electric vehicle identified at step 350. At step 370, the results of the application of the charge rate reduction rules are received and analyzed. If the electric vehicle does not qualify for a charge rate reduction, the process returns to step 340. However, if the electric vehicle is determined to qualify for a charge rate reduction at step 370, the vehicle is added to a list of electrical vehicles that qualify for a charge rate reduction at step 375. After completion of step 375, the process returns to step 340.

However, if at step 320 the requested reduction in load equals or exceeds the total load available for reduction, the process proceeds to step 325 where the list of electrical vehicles that meet the request charge reduction is obtained. The process then proceeds to step 380. At step 380, the information aggregator sends a request to the OEM to execute charge cessation events on each of the vehicles added to the charge cessation list and to execute charge rate reductions on each of the vehicles added to the charge rate reduction list. The information aggregator also requests that the OEM transmit information pertaining to the OEM's response to the request sent at step 380. At step 385, the information aggregator receives information pertaining to the OEM's response and stores the information at the database 146. At step 390, the process ends.

Figure 4:
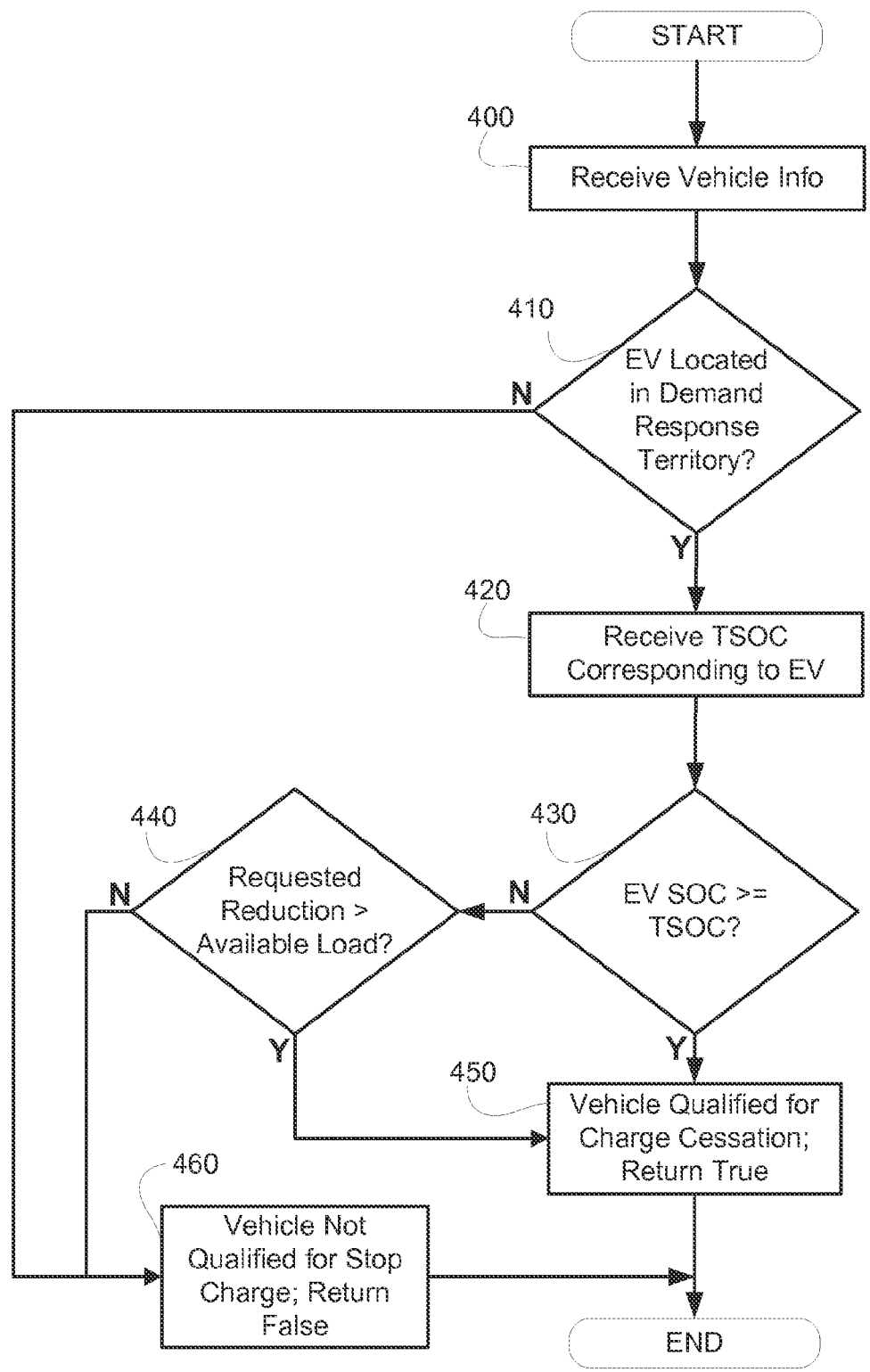
FIG. 4 is a flow chart summarizing an example process for determining whether a vehicle qualifies for charging cessation.

FIG. 4 is a flow chart summarizing an example process for determining whether a vehicle qualifies for charge cessation event. The example process depicted by FIG. 4 or a similar process may be implemented, for example, at step 350 of the process depicted by FIG. 3. At step 400, the process receives information pertaining to a particular electrical vehicle. The information received at step 400 may include but is not limited to a vehicle identification number (VIN), an energy capacity of the battery, a current level of energy stored in the battery, a current charge status (i.e. charging or not charging), a current rate of charging, an estimated time at which charging will be completed, an estimated time at which a future charging event will commence, an estimated completion time at which a future charging event will be completed, a vehicle model, an electrical vehicle type (e.g. hybrid, pure electric vehicle), an identity of an owner or user of the vehicle, an identifier for a user account associated with the vehicle, one or more upcoming use events for the vehicle, a use schedule for the vehicle, one or more upcoming activities or events that an owner or user of the vehicle will participate in, a schedule for an owner or user of the vehicle, a use history of the vehicle, and a predictive forecast of use of the vehicle. In some implementations, the information received at step 400 also includes the number of demand response requests that have been made to the vehicle during one or more periods of time. For example, the number of times a demand response request has been sent to each vehicle during the previous year may be received. In addition, the average number of demand response requests made to a particular vehicle during a particular period of time may be received at step 400. For example, the average number of times per month that demand response requests have been sent to each vehicle during the previous six months may be received at step 400.

At step 410, information pertaining to the current location of the vehicle received at step 400 is compared to information pertaining to the DRP territory. In some implementations, the program territory is a predefined geographic shape file that provides the territory for a particular DRP. If the vehicle is not in the DRP territory, the process proceeds to step 450. However, if the vehicle is located in the DRP territory, the process proceeds to step 420.

At step 420, the process determines the threshold state of charge (TSOC) for the type of electric vehicle corresponding to the electrical vehicle for which information was received at step 400. At step 430, the TSOC is compared with the current SOC of the vehicle for which information was received at step 400. If the SOC of the vehicle exceeds or is equal to the TSOC the process proceeds to step 450. However, if the SOC of the electric vehicle is less than the TSOC, the process proceeds to step 440.

At step 440, a charge opportunity formula is evaluated. The charge opportunity formula determines whether or not the electric vehicle will be able to achieve the TSOC prior to its anticipated departure time. The charge opportunity formula is satisfied if the anticipated vehicle departure will occur after the expiration of the DRP by an amount of time greater than or equal to the amount of time required for the vehicle to finish charging. If the charge opportunity formula is satisfied, the process proceeds to step 450 where the process returns true. For example, if the current time is 4:00 PM, the vehicle's anticipated departure time is 8:00 PM, the vehicle requires two hours of additional charging time to acquire the TSOC, the duration of the DRP is one hour, the charge opportunity formula will be satisfied and the process will proceed to step 450 where the process returns the Boolean value true. However, if instead the current time were 6:00 PM and all other values the same as in the preceding example, the charge opportunity formula would not be satisfied. If the charge opportunity formula is not satisfied, the process proceeds to step 460, where the process returns the Boolean value false. At step 470, the process ends.

In some implementations, the charge opportunity formula also provides for a time buffer designed to ensure that the vehicle will be able to reach the TSOC before departure if it is subjected to participation in the DRP. In such implementations, the charge opportunity formula is satisfied if the anticipated vehicle departure will occur after the expiration of the DRP by an amount of time greater than or equal to the amount of time required for the vehicle to obtain the TSOC plus a predetermined amount of time deemed the buffer time. For example, if the if the current time is 4:00 PM, the vehicle's anticipated departure time is 8:00 PM, the vehicle requires two hours of additional charging time to acquire the TSOC, the duration of the DRP is one hour, and the buffer time is thirty minutes, the charge opportunity formula will be satisfied. However, if all values are identical to those in the preceding example except that the buffer time is ninety minutes, the charge opportunity formula will not be satisfied.

In some implementations, the TSOC completion time is computed according to a formula that utilizes the capacity of the vehicle's batter, the TSOC, and the current SOC. In some implementations, the TSOC completion time is defined by the formula $$TSOC\ completion\ time = \frac{Battery\ Capcity \times \left(\frac{TSOC - current\ SOC}{100}\right) \times 60}{Current\ Energy\ Consumption}.$$

Figure 5:
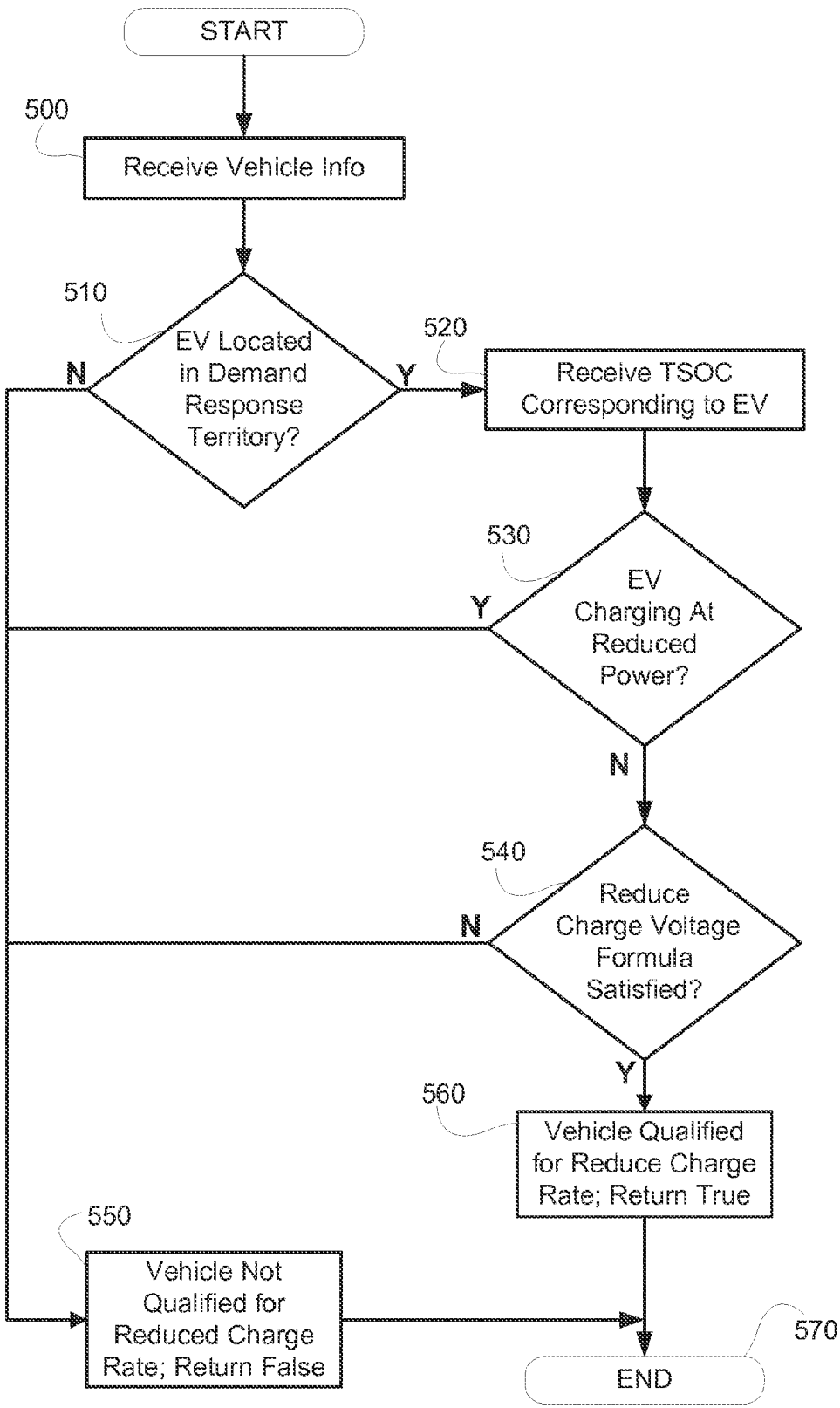
FIG. 5 is a flow chart summarizing an example process for determining whether a vehicle qualifies for a rate of charging reduction.

FIG. 5 is a flow chart summarizing an example process for determining whether a vehicle qualifies for a reduction in charging voltage. The example process depicted by FIG. 5 or a similar process may be implemented, for example, at step 350 of the process depicted by FIG. 3. At step 500, the process receives information pertaining to a particular electrical vehicle. The information received at step 500 may include but is not limited to a vehicle identification number (VIN), an energy capacity of the battery, a current level of energy stored in the battery, a current charge status (i.e. charging or not charging), a current rate of charging, an estimated time at which charging will be completed, an estimated time at which a future charging event will commence, an estimated completion time at which a future charging event will be completed, a vehicle model, an electrical vehicle type (e.g. hybrid, pure electric vehicle), an identity of an owner or user of the vehicle, an identifier for a user account associated with the vehicle, one or more upcoming use events for the vehicle, a use schedule for the vehicle, one or more upcoming activities or events that an owner or user of the vehicle will participate in, a schedule for an owner or user of the vehicle, a use history of the vehicle, and a predictive forecast of use of the vehicle. In some implementations, the information received at step 500 also includes the number of demand response requests that have been made to the vehicle during one or more periods of time. For example, the number of times a demand response request has been sent to each vehicle during the previous year may be received. In addition, the average number of demand response requests made to a particular vehicle during a particular period of time may be received at step 500. For example, the average number of times per month that demand response requests have been sent to each vehicle during the previous six months may be received at step 500.

At step 510, information pertaining to the current location of the vehicle received at step 500 is compared to information pertaining to the DRP territory. In some implementations, the program territory is a predefined geographic shape file that provides the territory for a particular DRP. If the vehicle is not in the DRP territory, the process proceeds to step 550. However, if the vehicle is located in the DRP territory, the process proceeds to step 520.

At step 520, the process determines the threshold state of charge (TSOC) for the type of electric vehicle corresponding to the electrical vehicle for which information was received at step 500. At step 530, the process determines whether or not the vehicle is currently charging, and if so, whether or not the vehicle is charging through a reduced voltage. If it is determined that the vehicle is charging at a reduced voltage at step 530, the process proceeds to step 550. However, if the vehicle is not charging at a reduced voltage, the process proceeds to step 540. In some implementations, the determination of whether or not the vehicle is charging at a reduced voltage is performed according to the formula $$Power_{Diff_{Constant}} >$$
$$\frac{Max_{Charge_{Power}}}{2} - Current_{Charge_{Power}} > (-)Power_{Diff_{Constant}}.$$

At step 540, a reduce charge voltage formula is evaluated. The reduce charge voltage formula determines whether or not the electric vehicle will be able to achieve the TSOC prior to its anticipated departure time while charging at a reduced voltage. The reduce charge voltage formula is satisfied if the anticipated vehicle departure will occur at a time later than the current time plus the amount of time required for the vehicle to obtain the TSOC while charging at a reduced voltage. If the charge opportunity formula is satisfied, the process proceeds to step 560 where the process returns true. For example, if the current time were 4:00 PM, the vehicle's anticipated departure time were 8:00 PM, and the vehicle requires three hours of additional charging time at a reduced voltage to acquire the TSOC, the charge opportunity formula will be satisfied and the process will proceed to step 560 where the process returns the Boolean value true. However, if instead the current time were 6:00 PM and all other values the same as in the preceding example, the charge opportunity formula would not be satisfied. If the charge opportunity formula is not satisfied, the process proceeds to step 550, where the process returns the Boolean value false. At step 570, the process ends.

In some implementations, the reduce charge voltage formula also provides for a time buffer designed to ensure that the vehicle will be able to reach the TSOC before departure if it is subjected to charging at a reduced voltage. In such implementations, the reduce charge voltage formula is satisfied if the anticipated vehicle departure will occur at a time later than the current time plus the amount of time required for the vehicle to obtain the TSOC while charging at a reduced voltage plus a predetermined amount of time deemed the buffer time. For example, if the current time were 4:00 PM, the vehicle's anticipated departure time were 8:00 PM, the vehicle requires three hours of additional charging time at a reduced voltage to acquire the TSOC, and the buffer time is thirty minutes, the reduce charge voltage formula will be satisfied and the process would proceed to step 560 where the process would return the Boolean value true. However, if instead the buffer time were ninety minutes and all other values the same as in the preceding example, the charge opportunity formula would not be satisfied and the process would proceed to step 550 where the process would return the Boolean value false.

In some implementations, the reduce charge voltage formula is computed according to a formula that utilizes the capacity of the vehicle's batter, the TSOC, and the current SOC. In some implementations, the TSOC completion time is defined by the formula $$TSOC\ completion\ time = \frac{Battery\ Capcity \times \left(\frac{TSOC - current\ SOC}{100}\right) \times 60}{Current\ Energy\ Consumption}.$$

It will be appreciated by those of skill in the art that the information exchanged between the user, the call center, and the recharging station may vary in content. For example, the call center may have the authority to schedule a recharging event on behalf of the user without allowing the user to select amongst appropriate recharging stations. In such an embodiment, the call center may select the recharging station that is the best match based upon the criteria selected by the user.

It will be appreciated by those of skill in the art that the execution of the various machine-implemented processes and steps described herein may occur via the computerized execution of computer-executable recommendations stored on a tangible computer-readable medium, e.g., RAM, ROM, PROM, volatile, nonvolatile, or other electronic memory mechanism. Thus, for example, the operations performed by the telematics unit may be carried out according to stored recommendations or applications installed on the telematics unit, and operation performed at the call center may be carried out according to stored recommendations or applications installed at the call center.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, implemented by an information aggregator having one or more processors, for reducing a present electricity consumption load on an electricity supplier attributable to charging of electric vehicles, the method comprising:
   receiving, at the information aggregator, a request to activate a demand response program (DRP) for a group of electrical vehicles enrolled in the DRP to reduce a present demand on the electricity supplier pursuant to the activated DRP;
   receiving, at the information aggregator, information pertaining to, on an individualized basis, members of the group of electrical vehicles enrolled in the DRP;
   identifying, based upon individualized information for members of the group of electrical vehicles enrolled in the DRP, present candidates for participation in the activated DRP; and
   transmitting instructions to the present candidates to facilitate a reduction in demand for electricity attributable to charging the present candidates while the DRP is activated.

2. The method of claim 1, wherein the receiving, at the information aggregator, information pertaining to, on an individualized basis, members of a group of electrical vehicles enrolled in the DRP comprises:
   receiving identifying information for the members of the group of electric vehicles;
   requesting, based on the identifying information, information pertaining to the charging activities of the members of the group of electric vehicles; and
   receiving information pertaining to the charging activities of the members of the group of electric vehicles.

3. The method of claim 2, wherein the requesting information pertaining to the charging activities of the members of the group of electric vehicles comprises:
   for each of the members, sending a request for information pertaining to the charging activities of the member vehicle from one of the group consisting of: the telematics unit of the member vehicle, the original equipment manufacturer (OEM) of the member vehicle, and a telematics service provider to which the member vehicle subscribes.

4. The method of claim 2, wherein the receiving information pertaining to the charging activities of the members of the group of electric vehicles comprises:
for each of the members, receiving information pertaining to the charging activities of the member vehicle from one of the group consisting of: the telematics unit of the member vehicle, the original equipment manufacturer (OEM) of the member vehicle, and a telematics service provider to which the member vehicle subscribes.

5. The method of claim 1, wherein the identifying, based upon individualized information for members of the group of electrical vehicles, candidates for participation in the DRP comprises:
identifying members of the group of electric vehicles that are enrolled in the DRP that are currently on grid or that will become on grid during the period of time during which the DRP is active; and
identifying the member vehicles that are currently on grid or that will become on grid during the period of time during which the DRP is active that qualify for a cessation of charging event or a reduction in charging rate event.

6. The method of claim 5, further comprising identifying members of the group of electric vehicles that are enrolled in the DRP that are currently within a geographic region defined as the DRP territory or that will move into the geographic region defined as the DRP territory during the period of time during which the DRP is active.

7. The method of claim 5, further comprising identifying members of the group of electric vehicles that are enrolled in the DRP that have not participated in more than a maximum number of DRPs during a past time period.

8. The method of claim 5, wherein a vehicle qualifies for a cessation of charging event if the anticipated departure of the vehicle will occur after a charge cessation threshold state of charge completion time; and
wherein a vehicle qualifies for a reduction in charging rate event if the anticipated departure time of the vehicle will occur after a charge rate reduction threshold state of charge completion time.

9. The method of claim 8, wherein a charge cessation threshold state of charge completion time is defined as the current time plus the remaining duration of the DRP plus the time required for the vehicle to achieve a predetermined threshold rate of charge under normal charging conditions plus a predetermined buffer time; and
a charge rate reduction threshold state of charge completion time is defined as the current time plus the remaining duration of the DRP plus the time required for the vehicle to achieve a predetermined threshold state of charge under normal charging conditions after charging a reduced rate during the DRP plus a predetermined buffer time.

10. The method of claim 9, wherein the predetermined buffer time is equal to zero.

11. The method of claim 1, wherein receiving, at the information aggregator, information pertaining to, on an individualized basis, members of the group of electrical vehicles enrolled in the DRP and identifying, based upon individualized information for members of the group of electrical vehicles, candidates for participation in the DRP are repeated throughout the period of time.

12. The method of claim 1, wherein the transmitting instructions to the candidates to facilitate a reduction in demand for electricity attributable to charging the candidates while the DRP is activate comprises:
transmitting instructions, on an individualized basis, for vehicles to implement one of the group consisting of: a cessation of charging event and a reduction in charging rate event,
wherein the instructions for each vehicle are transmitted to one of the group consisting of: a telematics unit of the vehicle, an original equipment manufacturer of the vehicle, and a telematics service provider to which the vehicle subscribes.

13. The method of claim 1, wherein identifying, based upon individualized information for members of the group of electrical vehicles, candidates for participation in the DRP comprises populating a list of members of the group of electrical vehicles that are enrolled in the DRP that qualify for a cessation of charging or a reduction in charging rate event; and
wherein transmitting instructions to the candidates to facilitate a reduction in demand for electricity attributable to charging the candidates while the DRP is activate comprises identifying a group of vehicles from the populated list that provide a charge reduction equal to or greater than a charge reduction goal and transmitting instructions, on an individualized basis, for the vehicles to implement one of the group consisting of: a cessation of charging event and a reduction in charging rate event.

14. A system for reducing a present electricity consumption load on an electricity supplier attributable to charging of electric vehicles during a period of time, comprising:
a processor; and
a non-transitory computer readable medium having stored thereon computer executable instructions, the instructions comprising:
instructions for receiving, by the information aggregator, a request to activate a demand response program (DRP) for a group of electrical vehicles enrolled in the DRP to reduce a present demand on the electricity supplier pursuant to the activated DRP;
instructions for receiving, by the information aggregator, information pertaining, on an individualized basis, to members of the group of electric vehicles enrolled in the DRP;
instructions for identifying, based upon individualized information for one or more members of the group of electric vehicles enrolled in the DRP, present candidates for participation in the activated DRP; and
instructions for transmitting, to the present candidates, additional instructions to facilitate a reduction in demand for electricity attributable to charging the present candidates while the DRP is activated.

15. The system of claim 14, wherein the instructions for receiving, by the information aggregator, information pertaining, on an individualized basis, to members of the group of electric vehicles enrolled in the DRP comprise:
instructions for receiving, on an individualized basis, identifying information for the members of the group of electric vehicles;
instructions for requesting, based on the identifying information, information pertaining to the charging activities of the members of the group of electric vehicles; and
instructions for receiving information pertaining to the charging activities of the members of the group of electric vehicles.

16. The system of claim 14, wherein the instructions for identifying, based upon individualized information for one or more members of the group of electric vehicles, candidates for participation in the DRP comprise:

instructions for identifying members of the group of electric vehicles that are enrolled in the DRP that are currently on grid or that will become on grid during the period of time during which the DRP is active; and instructions for identifying the member vehicles that are currently or will become on grid during the period of time during which the DRP is active that qualify for a cessation of charging event or a reduction in charging rate event.

17. The system of claim 14, wherein the instructions for receiving, by the information aggregator, information pertaining, on an individualized basis, to members of the group of electric vehicles enrolled in the DRP and for identifying, based upon individualized information for one or more members of the group of electric vehicles, candidates for participation in the DRP are repeatedly issued throughout the period of time.

18. The method of claim 14, wherein the instructions for transmitting, to the candidates, additional instructions to facilitate a reduction in demand for electricity attributable to charging the candidates while the DRP is active comprise:

instructions for transmitting additional instructions to candidates to implement one of the group consisting of: a cessation of charging event and a reduction in charging rate event, wherein the additional instructions to each candidate are transmitted to one of the group consisting of: a telematics unit of the candidate, an original equipment manufacturer of the candidate, and a telematics service provider to which the candidate subscribes.

19. The method of claim 14, wherein the instructions for identifying one or more members of the group of electrical vehicles that are candidates for participation in the DRP comprise instructions for populating a list of one or more members of the group of electrical vehicles that are enrolled in the DRP that qualify for a cessation of charging or a reduction in charging rate event; and wherein the instructions for transmitting, to the one or more candidates, additional instructions that facilitate a reduction in the demand for electricity attributable to the charging of the one or more candidates comprise instructions for identifying a group of vehicles from the populated list that provide a charge reduction equal to or greater than a requested charge reduction and instructions for transmitting additional instructions to one or more vehicles to implement one of the group consisting of: a cessation of charging event and a reduction in charging rate event.

20. A system for reducing a present electricity consumption load on an electricity supplier attributable to the charging of one or more members of a group of electric vehicles during a period of time, the system comprising:

a database configured to store data pertaining, on an individualized basis, to members of the group of electric vehicles and the charging activities of the members, and one or more processors configured to:

request, on an individualized basis, information pertaining to members of the group of electric vehicles and the charging activities of the members, to determine whether any of the members of the group are enrolled in a demand response program (DRP) for a group of electrical vehicles enrolled in the DRP to reduce a present demand on the electricity supplier pursuant to the DRP, receive a request to activate the DRP for the group of enrolled electrical vehicles, determine whether any of the members of the group of enrolled vehicles are present candidates for a cessation of charging event or a reduction in charging rate event, and transmit instructions, on an individualized basis, to facilitate a cessation of charging event or a reduction in charging rate event to the present candidates.

\* \* \* \* \*